US007440423B2

United States Patent
Stephens (10) Patent No.: US 7,440,423 B2
(45) Date of Patent: Oct. 21, 2008

(54) CHANNEL SPECIFICATION APPARATUS, SYSTEMS, AND METHODS

(75) Inventor: Adrian P. Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 10/806,898

(22) Filed: Mar. 23, 2004

(65) Prior Publication Data

US 2005/0152299 A1 Jul. 14, 2005

Related U.S. Application Data

(60) Provisional application No. 60/536,071, filed on Jan. 12, 2004.

(51) Int. Cl.
*H04Q 7/20* (2006.01)

(52) U.S. Cl. ............... 370/280; 370/281; 370/282; 370/294; 370/295; 370/321

(58) Field of Classification Search ............... 370/315, 370/328, 329, 341, 443, 444, 445, 465, 370, 370/280, 281, 294, 295, 321, 322, 337, 338, 370/343, 344, 430, 442, 480
See application file for complete search history.

(56) References Cited

U.S. PATENT DOCUMENTS

| 5,311,456 | A | | 5/1994 | Chiang et al. | |
|---|---|---|---|---|---|
| 5,485,221 | A | * | 1/1996 | Banker et al. | 348/563 |
| 5,907,812 | A | * | 5/1999 | Van De Berg | 455/461 |
| 5,960,351 | A | | 9/1999 | Przelomiec | |
| 6,459,690 | B1 | * | 10/2002 | Le Strat et al. | 370/332 |
| 6,529,488 | B1 | * | 3/2003 | Urs et al. | 370/330 |
| 6,598,200 | B1 | * | 7/2003 | Greenwood et al. | 714/774 |
| 6,775,261 | B1 | * | 8/2004 | Banister | 370/344 |
| 6,856,611 | B2 | * | 2/2005 | Chaudhuri et al. | 370/335 |
| 6,912,204 | B2 | * | 6/2005 | Kossi et al. | 370/252 |
| 7,089,577 | B1 | * | 8/2006 | Rakib et al. | 725/87 |
| 7,158,769 | B2 | * | 1/2007 | Okanoue et al. | 455/226.1 |
| 2002/0173271 | A1 | | 11/2002 | Blair et al. | |
| 2003/0054827 | A1 | * | 3/2003 | Schmidl et al. | 455/450 |
| 2003/0087645 | A1 | * | 5/2003 | Kim et al. | 455/453 |
| 2003/0185166 | A1 | * | 10/2003 | Belcea | 370/321 |

(Continued)

FOREIGN PATENT DOCUMENTS

WO WO-97/37441 A1 10/1997

(Continued)

OTHER PUBLICATIONS

"International Search Report for corresponding PCT Application No. PCT/US2005/001527", (Jun. 24, 2005), 4 pgs.

(Continued)

*Primary Examiner*—Duc Nguyen
*Assistant Examiner*—Julio R Perez
(74) *Attorney, Agent, or Firm*—Schwegman, Lundberg & Woessner, P.A.

(57) ABSTRACT

An apparatus and a system, as well as a method and article, may operate to select a group of contiguous communications channels having a specified number of channels, a center channel, and a control channel. Some embodiments may operate to select a group of contiguous communications channels having a specified control channel and a signed extension channel offset.

22 Claims, 5 Drawing Sheets

U.S. PATENT DOCUMENTS

| | | | |
|---|---|---|---|
| 2004/0136438 A1* | 7/2004 | Fullerton et al. | 375/130 |
| 2004/0142696 A1* | 7/2004 | Saunders et al. | 455/450 |
| 2004/0192208 A1* | 9/2004 | Kong et al. | 455/63.1 |
| 2004/0248530 A1* | 12/2004 | Rakib et al. | 455/127.4 |
| 2005/0090250 A1* | 4/2005 | Backes | 455/434 |
| 2005/0111424 A1 | 5/2005 | Tsai et al. | |
| 2006/0029146 A1 | 2/2006 | Catreux et al. | |
| 2006/0135081 A1 | 6/2006 | Mysore et al. | |
| 2006/0166619 A1* | 7/2006 | Roberts | 455/39 |
| 2007/0154221 A1* | 7/2007 | McNicol et al. | 398/135 |

FOREIGN PATENT DOCUMENTS

| | | |
|---|---|---|
| WO | WO-97/47147 A1 | 12/1997 |
| WO | WO-2005/025471 A1 | 3/2005 |
| WO | WO-2005/069667 A1 | 7/2005 |

OTHER PUBLICATIONS

"U.S. Appl. No. 10/880,158 Preliminary Amendment filed Jul. 29, 2004", 3 pgs.

"U.S. Appl. No. 10/880,158 Supplemental Preliminary Amendment filed Nov. 18, 2004", 3 pgs.

* cited by examiner

CHANNEL SPECIFICATION APPARATUS, SYSTEMS, AND METHODS

PRIORITY CLAIM

This application claims the benefit of priority under 35 U.S.C. § 119(e) to U.S. Provisional Patent Application Ser. No. 60/536,071, titled "A System, Apparatus, and Associated Methods for High Throughput Wireless Networking," filed on Jan. 12, 2004, and incorporated herein by reference in its entirety.

TECHNICAL FIELD

Various embodiments described herein relate to communications generally, including apparatus, systems, and methods used to transmit and receive information via wireless networks and assigned channels.

BACKGROUND INFORMATION

Due to an increasing demand for greater throughput in multimedia communications, there is a desire to communicate using potentially available wide bandwidth channels. Such channels may overlap the frequency coverage of relatively narrow bandwidth legacy channels. Devices operating to support multiple channel widths (e.g., wide bandwidth channels and legacy channels) may scan wide bandwidth channels for availability. The operation of such devices may be constrained, however, in that communications conducted using wide bandwidth channels may overlap concurrently-operating legacy channels. If legacy communication compatibility is to be maintained (e.g., to support medium reservation information), the question arises: how to specify the wide bandwidth channels that are to be used?

DETAILED DESCRIPTION

In some embodiments, and according to some emerging protocols, communications devices (some of which may support multiple channel bandwidths) may operate to scan a frequency spectrum to find a number of wide bandwidth, contiguous channels available for use. When this occurs, a limitation may be imposed: in some circumstances, at most one legacy IEEE (Institute of Electrical and Electronics Engineers) 802.11 system may be permitted to operate on one of these available channels. Thus, some devices are constrained so that, for any given width (number of channels), they must always include the legacy channel, perhaps so that signaling compatible with legacy devices can be received by them. For more information regarding the IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments.

In many embodiments, a compact representation of the wide bandwidth channels that may be used can be expressed in the form of channel parameters. Such channel parameters may be selected to include a group of contiguous communications channels having a specified number of channels, a center channel, and a control channel. In some embodiments, the channel parameters may be selected to include a group of contiguous communications channels using a specified control channel and a signed extension channel offset, such as −1, 0, +1.

For the purposes of this document, the term "overlapping channel" includes a wide bandwidth communications channel having a frequency allocation that at least partially overlaps the frequency allocated to a legacy-overlapped channel. For example, an overlapping wide bandwidth channel may have a bandwidth of 40 MHz (megahertz) or 80 MHz that partially, or completely, overlaps one, two or four 20 MHz legacy channels, respectively. Thus, an "overlapped channel" refers to any legacy channel having a frequency bandwidth allocation that is at least partially overlapped by the frequency bandwidth allocated to an overlapping channel.

FIGS. 1A, 1B, 1C, 1D, and 1E are channel-mapping sequence diagrams according to various embodiments. In these figures, specific embodiments are shown for simplicity, and they should not be used to limit all of the embodiments disclosed herein. For example, channels may be selected in a substantially serial fashion, even though this type of reservation activity is but one of several options available.

Figure 1A:
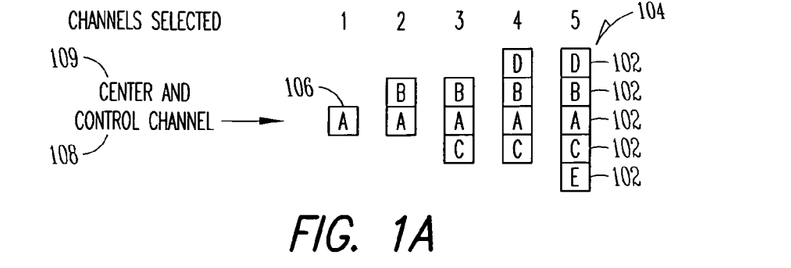
FIGS. 1A, 1B, 1C, 1D, and 1E are channel-mapping sequence diagrams according to various embodiments.
Figure 1B:
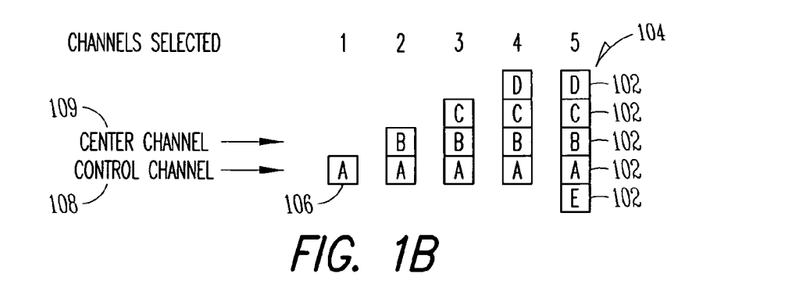
Figure 1C:
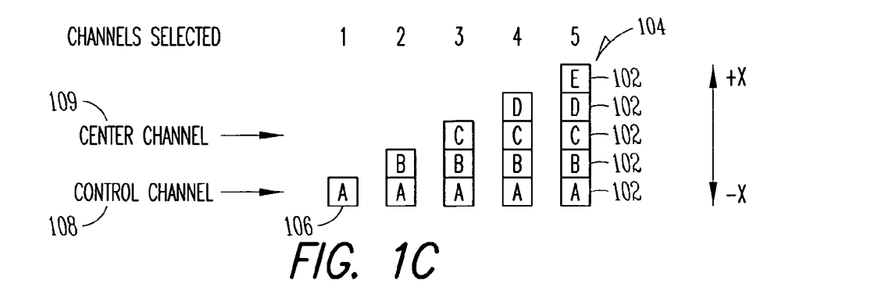

Referring now to FIGS. 1A-1C, assume a communications device supports transmission and/or reception activities that make use of one or more channels (e.g., overlapping channels) 102 in the contiguous channel group 104. The overlapping channels may partially or completely overlap one or more communications channels (e.g., overlapped channels) 106, examples of which are those channels known to those of skill in the art as "legacy" channels. Given a width specified as a number of channels, a center channel number, and a control channel number, the channel group 104 to be used by a device may be selected such that a control channel 108 is selected and, as needed, other channels may be selected so as to be approximately centered on the center channel 109. Thus the channel parameters in this case may be listed as: control channel, center channel, and specified number of channels (e.g. control channel=A, center channel=A, and specified number of channels=5 for FIG. 1A; control channel=A, center channel=B, and specified number of channels=5 for FIG. 1B; control channel=A, center channel=C, and specified number of channels=5 for FIG. 1C).

In FIG. 1A, it can be seen that the channels 102 (e.g., A, B, C, D, and E) in the channel group 104 may be selected according to a number of embodiments, including: (1) starting from the control channel, use channels until the center channel is used (e.g., A); and then (2) use channels moving away from the center channel alternately above and below the center channel (e.g., AB, ABC, ABCD, and ABCDE).

Referring now to FIG. 1B, it can be seen that in some embodiments the channels 102 in the channel group 104 may be selected by: (1) starting from the control channel, use channels until the center channel is used (e.g., A, AB); then (2) use channels moving away from the center channel on the opposite side to the control channel until an equal number of channels are used each side of the center channel (e.g., ABC); and then (3) use channels moving away from the center channel alternately above and below the center channel (e.g., ABCD, and ABCDE).

In FIG. 1C, it can be seen that in some embodiments the channels 102 in the channel group 104 may be selected by: (1) starting from the control channel, use channels until the center channel is used (e.g., A, AB, ABC), and then (2) use channels moving away from the center channel on the opposite side of the control channel until an equal number of channels are used each side of the center channel. (e.g., ABCD, and ABCDE). In some embodiments, channels may be selected by moving away from the center channel alternately below and above the center channel (rather than above and below the center channel, as described previously.

In some embodiments, the order in which the channels are selected may be the same for all devices. For example, the channels may be selected in order of frequency, or according to some other protocol that is defined prior to implementing the selection process.

In some embodiments, the group 104 of contiguous communications channels 102 may be selected using a specified control channel and a signed extension channel offset (e.g., in FIG. 1C, the control channel=A, and the signed extension offset=+4 since the channels move in the direction +X of increasing frequency). Offsets may be positive (e.g., the arrangement of channels 102 in FIG. 1C), zero (e.g., only the single control channel is used), and negative (moving away from the control channel in the direction -X of decreasing frequency).

Figure 1D:
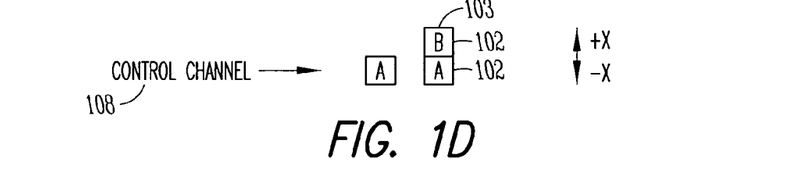
Figure 1E:
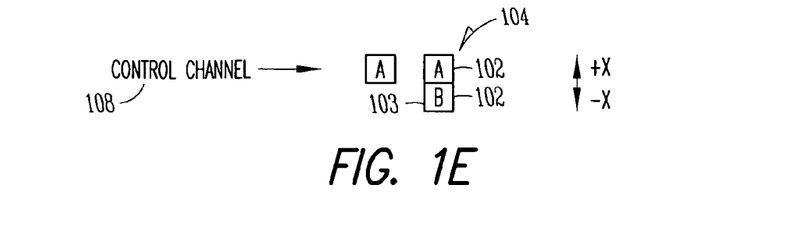

As a further example, in FIG. 1D, it can be seen that in some embodiments the group 104 of contiguous communications channels 102 may include a control channel 108 and a channel 103 identified with a signed offset extension of +1. Two contiguous channels 102 result. Similarly, in FIG. 1E, it can be seen that in some embodiments the group 104 of contiguous communications channels 102 may include a control channel 108 and a channel 103 identified with a signed offset extension of -1. Again, two contiguous channels 102 result.

Figure 2:
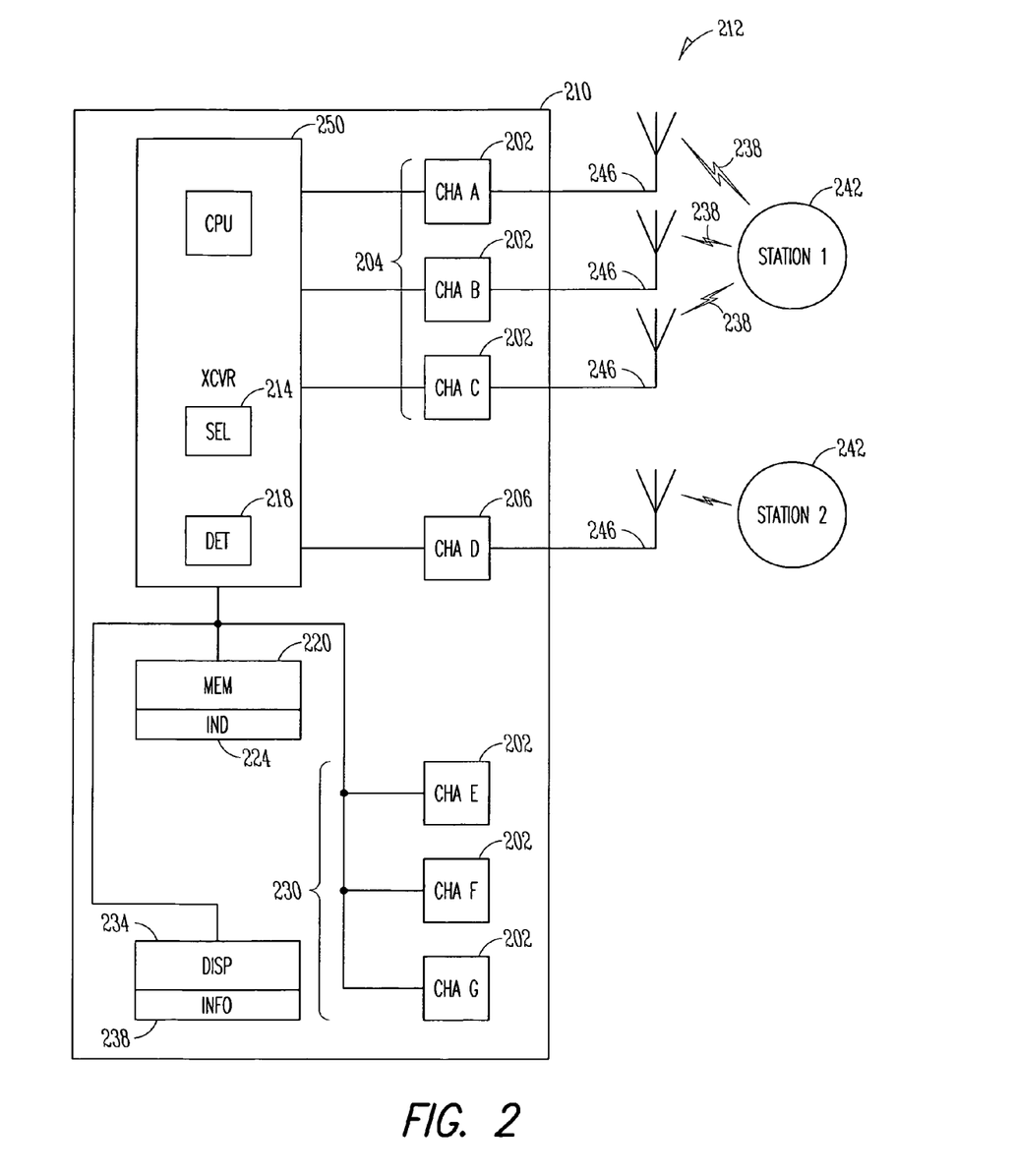
FIG. 2 is a block diagram of an apparatus and a system according to various embodiments.

FIG. 2 is a block diagram of an apparatus 210 and a system 212 according to various embodiments of the invention, each of which may operate in the manner described. For example, an apparatus 210 may comprise a channel selection module 214 to select a group 204 of contiguous communications channels 202 having a specified control channel (e.g., CHA A) and a signed extension channel offset (e.g., -2, to include channels CHA B and CHA C, and assuming a decreasing frequency offset from the control channel CHA A).

The apparatus 210 may also include a determination module 218 to determine the existence of legacy channels 206 (e.g., CHA D) overlapped by one or more channels 202 in the group 204. A memory 220 may be included in the apparatus 210 to couple to the channel selection module 214 and to store one or more indications 224, such as an indication of the group 204 (e.g., where the indication 224 indicates that channels CHA A, CHA B, and CHA C are included in the group 204), and/or an indication of at least one overlapped legacy channel 206 (e.g., where the indication 224 indicates that the channel CHA D is a legacy channel). Thus, the channel selection module 214 may be used to select a successive group 230 of contiguous communications channels 202 (e.g., CHA E, CHA F, and CHA G) upon detection of an overlapped legacy channel 206 (e.g., CHA D) by the first group 204. Other embodiments may be realized.

For example, a system 212 may include an apparatus 210, as well as a display 234 to display information 238, wherein at least a portion of the information 238 is to be communicated using the first group 204, perhaps to one or more stations 242. The system 212 may include one or more energy conduits 246 to couple to the group 204. Energy conduits 246 may be selected from one or more of an omnidirectional antenna, a patch antenna, a dipole antenna, a unidirectional antenna, an infra-red transmitter, an infra-red receiver, photoemitters and receptors, and charge-coupled devices, among others.

The system 212 may include a transceiver 250 to couple to the energy conduits 246 and to communicate information 238 using the first group 204. As noted previously, the channel selection module 214 may be used to select a successive group 230 of contiguous communications channels upon detection of an overlapped legacy channel 206 (e.g., CHA D) by the first group 204.

The channels 102, 202, channel groups 104, 204, 230, legacy channels 106, 206, control channel 108, center channel 109, apparatus 210, system 212, channel selection module 214, determination module 218, memory 220, indications 224, display 234, information 238, stations 242, energy conduits 246, and transceiver 250 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 210 and the system 212, and as appropriate for particular implementations of various embodiments.

It should also be understood that the apparatus and systems of various embodiments can be used in applications other than transmitters and receivers, and other than for wireless systems, and thus, various embodiments are not to be so limited. The illustrations of an apparatus 210 and system 212 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Figure 3A:
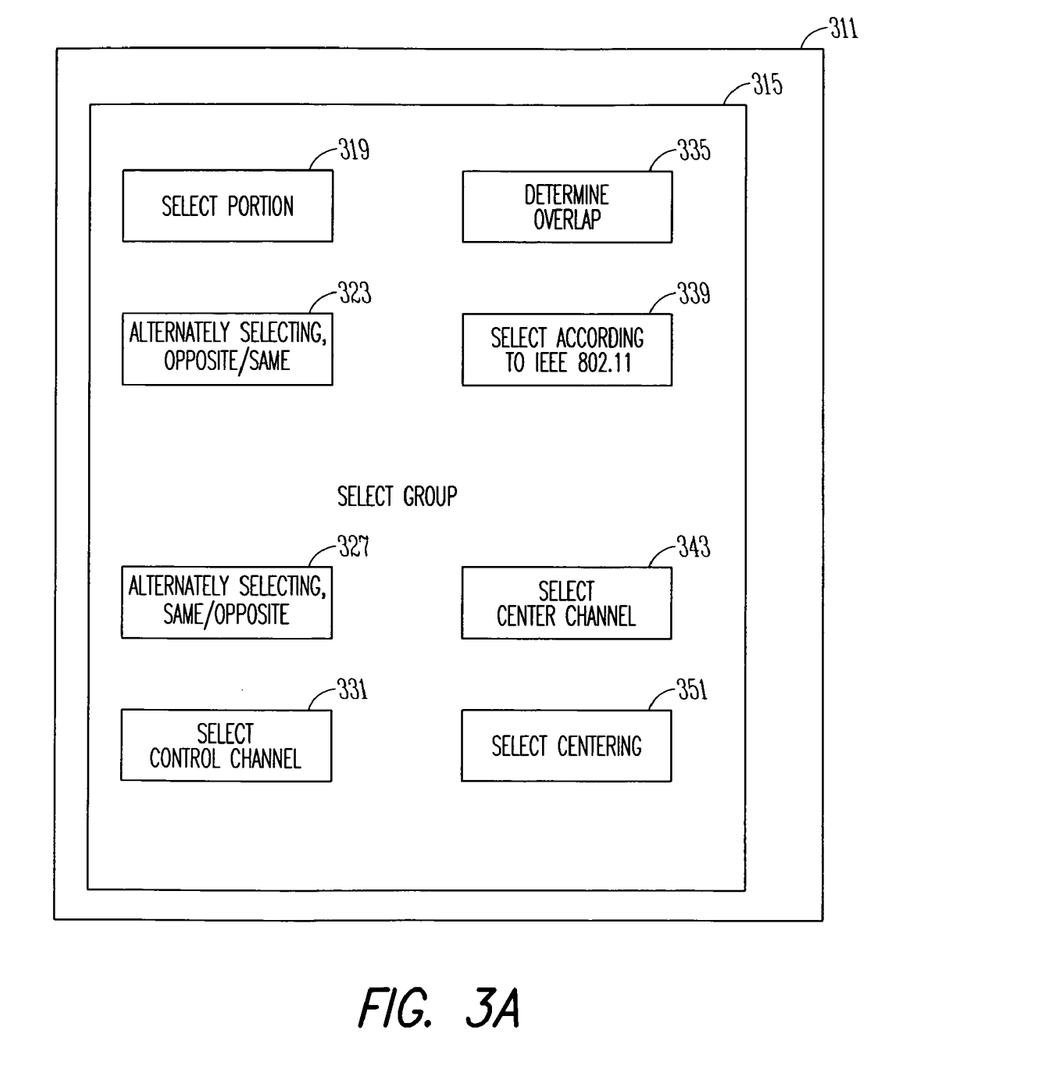
FIGS. 3A and 3B are flow charts illustrating several methods according to various embodiments.
Figure 3B:
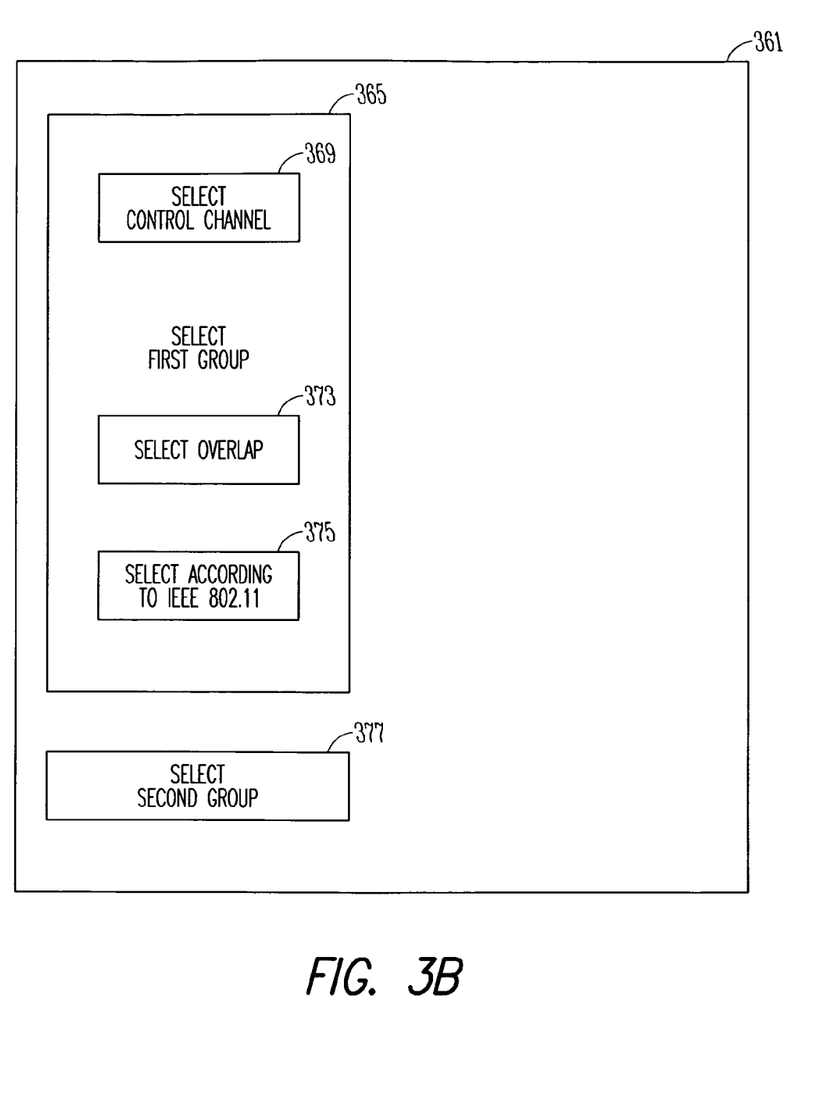

FIGS. 3A and 3B are flow charts illustrating several methods according to various embodiments. Thus, in some embodiments of the invention, a method 311 may begin with selecting a group of contiguous communications channels having a specified number of channels, a center channel, and a control channel at block 315. Selecting the group may further include selecting at least a portion of the contiguous communications channels to include the center channel and the control channel at block 319.

In some embodiments, the method 311 may include alternately selecting an additional channel not included in the portion on an opposite side of the center channel as the control channel, and on a same side of the center channel as the control channel, until the specified number of channels is selected at block 323. In some embodiments, the method 311 may include alternately selecting an additional channel not included in the portion on a same side of the center channel as the control channel, and on an opposite side of the center channel as the control channel, until the specified number of channels is selected at block 327.

Selecting the group at block 315 may include selecting the control channel to overlap a legacy channel, perhaps in conjunction with selecting the center channel to be different from the control channel at block 331. The method 311 may also include determining whether a legacy channel is overlapped by the group at block 335, perhaps via random, periodic, or continuous spectrum and/or channel scanning. In some embodiments, the group may be selected according to an IEEE 802.11 standard at block 339.

In some embodiments, selecting the group at block 315 may further include selecting the center channel to be the same as the control channel at block 343, perhaps with the specified number of channels equal to one. In some embodiments, the method 311 may include selecting the group to have the specified number of channels approximately centered on the center channel at block 351. Many other embodiments may be realized.

For example, referring now to FIG. 3B, it can be seen that a method 361 may include selecting a first group of contiguous communications channels having a specified control channel and a signed extension channel offset at block 365, which may in turn include selecting the control channel with a signed extension channel offset of zero if a specified channel width is one channel at block 369. Thus, in some embodiments, the activity at block 369 may include selecting only the control channel with a signed extension channel offset of zero. In some embodiments, a number of channels in the first group may be equal to an absolute value of the signed extension channel offset, plus one.

Selecting the first group at block 365 may further include selecting the control channel to overlap a legacy channel at block 373. In some embodiments, the method 361 may include selecting a second group of contiguous communications channels having at least one of a different specified control channel and a different signed extension channel offset upon detection of a legacy channel overlapped by the first group at block 377. In some embodiments, the first group may be selected according to an IEEE 802.11 standard at block 375.

In some embodiments, the first and/or second groups may be selected to prevent overlapping a legacy channel. In some embodiments, a value of the signed extension channel offset may be selected from an integer, such as { ..., −2, −1, 0, +1, +2, ... }. In some embodiments, a positive value of the signed extension channel offset may refer to a frequency spectrum above a spectrum including the control channel, and in some embodiments a negative value of the signed extension channel offset may refer to a frequency spectrum below the spectrum including the control channel.

It should be noted that the methods described herein do not have to be executed in the order described, or in any particular order. Moreover, various activities described with respect to the methods identified herein can be executed in serial or parallel fashion. Some activities may be repeated indefinitely, and others may occur only once. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized, as shown in FIG. 4.

Figure 4:
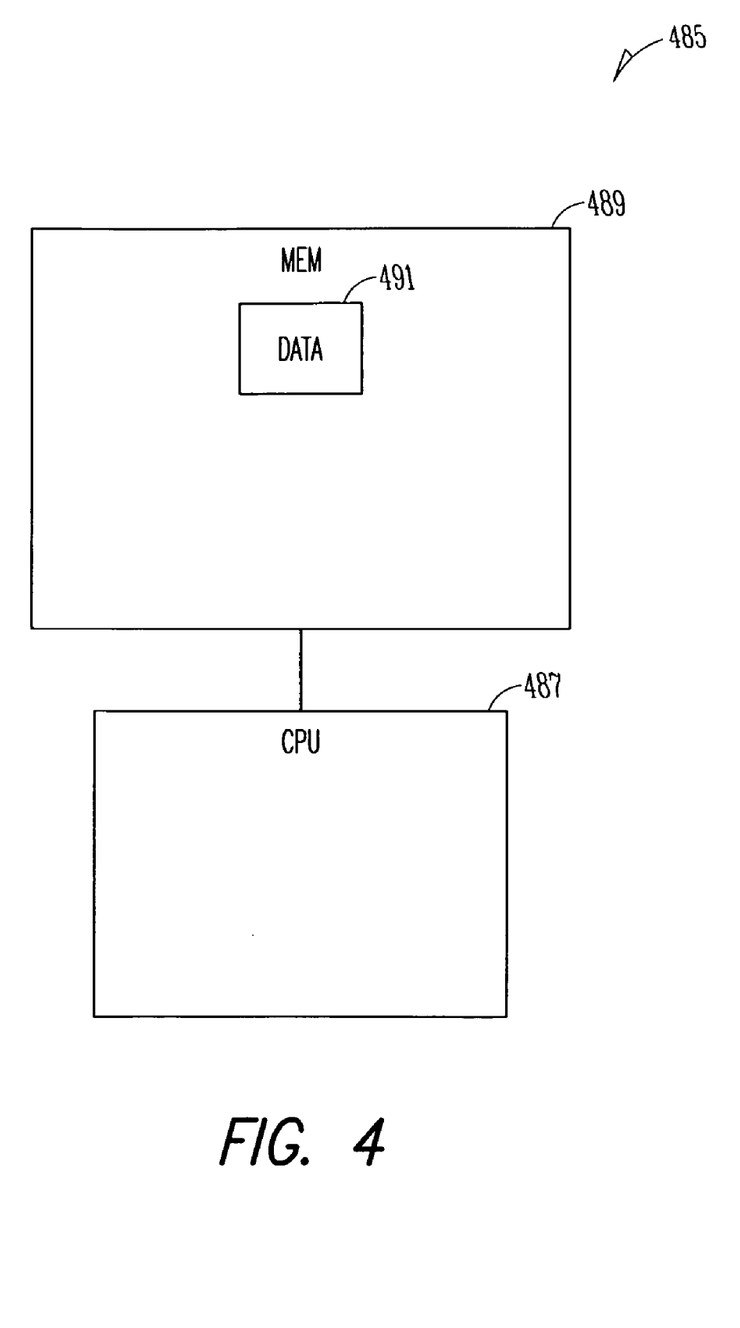
FIG. 4 is a block diagram of an article according to various embodiments.

FIG. 4 is a block diagram of an article 485 according to various embodiments of the invention, such as a computer, a memory system, a magnetic or optical disk, some other storage device, and/or any type of electronic device or system. The article 485 may comprise a processor 487 coupled to a machine-accessible medium such as a memory 489 (e.g., a memory including an electrical, optical, or electromagnetic conductor) having associated information 491 (e.g., computer program instructions, and/or other data), which when accessed, results in a machine (e.g., the processor 487) performing such actions as selecting a group of contiguous communications channels having a specified number of channels, a center channel, and a control channel. Additional activities may include selecting the center channel to be the same as the control channel with the specified number of channels equal to one, as well as selecting the control channel to overlap a legacy channel and selecting the center channel to be different from the control channel. Other activities may include selecting the group to have a specified number of channels approximately centered on the center channel.

In some embodiments, an article may include a machine-accessible medium having associated information, wherein the information, when accessed, results in a machine performing selecting a group of contiguous communications channels having a specified control channel and a signed extension channel offset. In some embodiments, the group may be selected to prevent overlapping a legacy channel. In some embodiments, a value of the signed extension channel offset may be selected from an integer. In some embodiments, a positive value of the signed extension channel offset may refer to a frequency spectrum above a spectrum including the control channel, and in some embodiments a negative value of the signed extension channel offset may refer to a frequency spectrum below the spectrum including the control channel.

Although the inventive concept may be discussed in the exemplary context of an 802.11x implementation (e.g., 802.11a, 802.11g, 802.11 HT, etc.), the claims are not so limited. Indeed, embodiments of the present invention may well be implemented as part of any wireless system using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

Implementing the apparatus, systems, and methods described herein may result in improved management of frequency spectrum use, especially when legacy channels are overlapped by wide bandwidth channels. Improved network throughput may be derived therefrom.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, including:
   first specifying a number of channels, a center channel, a control channel, and a signed extension channel offset; and
   second selecting a group of contiguous communications channels including the number of channels, the center channel, and the control channel,
   wherein selecting the group of contiguous communications channels further includes: selecting the center channel to be the same as the control channel when the specified number of channels is equal to one, and wherein the number of channels in the group of contiguous communications channels is equal to an absolute value of the signed extension channel offset plus one.

2. The method of claim 1, further including:
   alternately selecting an additional channel on an opposite side of the center channel as the control channel, and on a same side of the center channel as the control channel, until the specified number of channels is selected.

3. The method of claim 1, further including:
   alternately selecting an additional channel on a same side of the center channel as the control channel, and on an opposite side of the center channel as the control channel, until the specified number of channels is selected.

4. The method of claim 1, wherein selecting the group further includes:
   selecting the control channel to overlap a legacy channel.

5. The method of claim 1, further including:
   determining whether a legacy channel is overlapped by the group.

6. A computer readable medium encoded with instructions capable of being executed by a computer for accessing information for performing:
   first specifying a number of channels, a center channel, a control channel, and a signed extension channel offset; and
   second selecting a group of contiguous communications channels including the number of channels, the center channel, and the control channel,
   wherein selecting the group of contiguous communications channels further includes: selecting the center channel to be the same as the control channel when the specified number of channels is equal to one, and wherein the number of channels in the group of contiguous communications channels is equal to an absolute value of the signed extension channel offset plus one.

7. The computer readable medium of claim 6, wherein selecting the group further includes:
   selecting the control channel to overlap a legacy channel; and
   selecting the center channel to be different from the control channel.

8. The computer readable medium of claim 6, further including:
   selecting the group to have the specified number of channels approximately centered on the center channel.

9. A method, including:
   selecting a first group of contiguous communications channels having a specified control channel and a signed extension channel offset,
   wherein selecting the first group further includes selecting only the control channel with a signed extension channel offset of zero, and wherein a number of channels in the first group is equal to an absolute value of the signed extension channel offset plus one.

10. The method of claim 9, wherein selecting the first group further includes:
    selecting the control channel to overlap a legacy channel.

11. The method of claim 9, further including:
    selecting a second group of contiguous communications channels having at least one of a different specified control channel and a different signed extension channel offset upon detection of a legacy channel overlapped by the first group.

12. A computer readable medium encoded with instructions capable of being executed by a computer for accessing information for performing:
    selecting a group of contiguous communications channels having a specified control channel and a signed extension channel offset,
    wherein selecting the group further includes: selecting only the control channel with a signed extension channel offset of zero, and wherein a number of channels in the first group is equal to an absolute value of the signed extension channel offset plus one.

13. The computer readable medium of claim 12, wherein a value of the signed extension channel offset is selected from an integer.

14. The computer readable medium of claim 12, wherein the group is selected to prevent overlapping a legacy channel.

15. The computer readable medium of claim 12, wherein a positive value of the signed extension channel offset refers to a frequency spectrum above a spectrum including the control channel, and wherein a negative value of the signed extension channel offset refers to a frequency spectrum below the spectrum including the control channel.

16. An apparatus, including:
a channel selection module to select a group of contiguous communications channels having a specified control channel and a signed extension channel offset,
wherein selecting the group further includes: selecting only the control channel with a signed extension channel offset of zero, and wherein a number of channels in the first group is equal to an absolute value of the signed extension channel offset plus one.

17. The apparatus of claim 16, further including:
a determination module to determine the existence of legacy channels overlapped by the group.

18. The apparatus of claim 16, further including:
a memory to couple to the channel selection module and to store an indication of the group.

19. The apparatus of claim 16, further including:
a memory to couple to the channel selection module and to store an indication of at least one overlapped legacy channel.

20. A system, including:
a channel selection module to select a first group of contiguous communications channels having a specified control channel and a signed extension channel offset; and
a display to display information, wherein at least a portion of the information is to be communicated using the first group,
wherein selecting the first group further includes: selecting only the control channel with a signed extension channel offset of zero, and wherein a number of channels in the first group is equal to an absolute value of the signed extension channel offset plus one.

21. The system of claim 20, further including:
an energy conduit to couple to the group and selected from one of an omnidirectional antenna, an infra-red transmitter, and an infra-red receiver; and
a transceiver to couple to the energy conduit and to communicate information using the first group.

22. The system of claim 20, wherein the channel selection module is to select a successive group of contiguous communications channels upon detection of an overlapped legacy channel by the first group.

* * * * *